May 15, 1928.

C. B. GAMBLE 1,669,461

GAS FILTER

Filed Aug. 24, 1925

Inventor
CHARLES B. GAMBLE
By Paul, Paul & Moore
Attorneys

Patented May 15, 1928.

1,669,461

UNITED STATES PATENT OFFICE.

CHARLES B. GAMBLE, OF MINNEAPOLIS, MINNESOTA.

GAS FILTER.

Application filed August 24, 1925. Serial No. 52,150.

This invention relates to new and useful improvements in gas filters, and more particularly relates to improvements in such filters adapted for use in conjunction with gas burners to filter the gas supplied to the usual pilot light of a burner for the purpose of removing therefrom small particles of foreign material and other impurities which might enter the small passage or orifice through which the gas is delivered to the burner with a resultant clogging or obstructing of such passage and thus rendering the pilot light inoperative.

An object of the invention is to provide a gas filter of very simple and inexpensive construction comprising a sheet of porous material such, for instance, as paper which is adapted to be folded and inserted into a tubular member so that gas flowing through the member must filter therethrough, thereby positively removing all particles of foreign material from the flow of gas before being delivered to the burner for subsequent combustion.

A further object of the invention is to provide such a gas filter having the filtering material removably mounted thereon so that it may readily and conveniently be removed for cleaning or replacement when necessary.

The particular object of the invention, therefore, is to provide an improved gas filter.

Other objects of the invention will appear from the following description and the accompanying drawings, and will be pointed out in the annexed claims.

In the drawings there has been disclosed a structure designed to carry out the various objects of the invention, but it is to be understood that the invention is not confined to the exact features shown as various changes may be made within the scope of the claims which follow.

In the accompanying drawings forming part of this specification,

Figures 1, 2, 3:
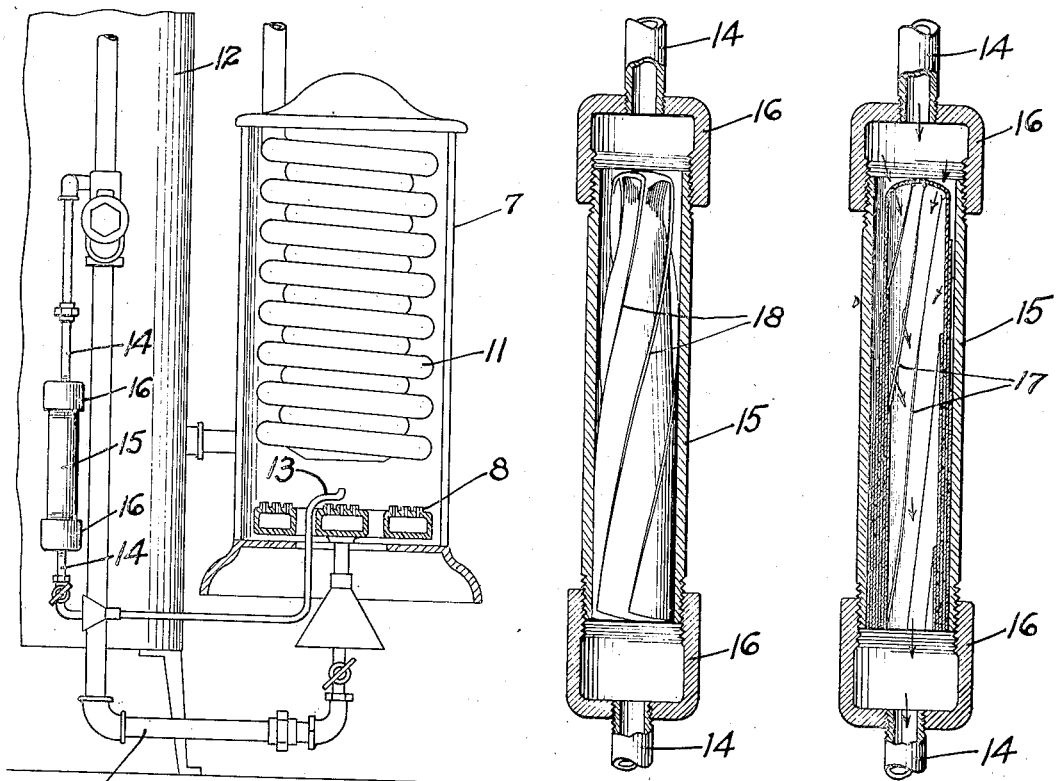
Figure 1 is a vertical sectional view of a common form of water heater and a portion of a hot water tank showing the invention applied thereto.
Figure 2 is a longitudinal sectional view through the filter casing showing how the filtering material is folded and inserted therein.
Figure 3 is a similar view but showing the filtering material in section also.

In the selected embodiment of the invention here shown for purposes of disclosure, there is illustrated a common form of water heater comprising a casing 7 having a gas burner 8 mounted in the lower portion thereof to which gaseous fluid is delivered through a supply pipe 9, as shown in Figure 1. The usual water coil 11 is mounted in the casing 7 and has a connection with the hot water tank 12 in the usual manner. The usual pilot light 13 is also shown mounted adjacent the burner and has a connection with the supply pipe 9 as shown.

An important feature of this invention resides in the novel means provided for filtering the gas delivered to the pilot light for the purpose of removing therefrom any fine particles of foreign material which might be carried along with the flow of gas and cause the small passage or orifice in the pilot light to become clogged or obstructed, if not removed from the gas. Such means preferably consists of a gas filter interposed in the connection 14 supplying gas to the pilot light 13 as shown in Figure 1.

This novel gas filter preferably comprises a cylindrical member or casing 15 in which a porous filtering material such, for instance, as a sheet of folded paper is inserted, as shown in Figures 2 and 3. Threaded caps 16 are mounted on each end of the member 15 to provide air-tight closures therefor, and these caps are tapped to receive the pipe connections 14. In the operation of the filter the gaseous fluid is delivered to one end of the filter and passes through the filtering material and out of the other end of the filter, thereby removing all fine particles of foreign material which might be contained in the flow of gas.

Figure 4:
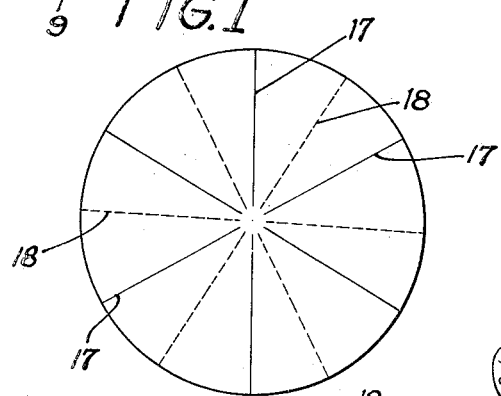
Figure 4 is a view showing the preferred form of the sheet of filtering material and also showing how it is preferably scored so that it may be conveniently folded for insertion in the filter casing or tube.
Figure 6:
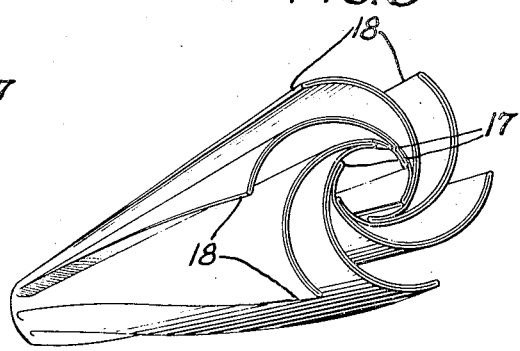
Figure 6 is a similar view showing how the filtering material is folded and twisted before being inserted into the filter casing.
Figure 5:
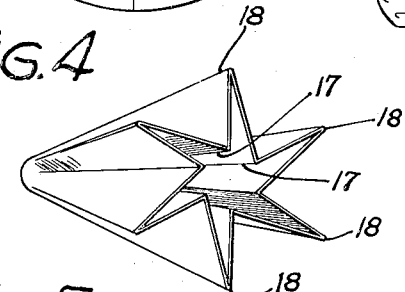
Figure 5 is a perspective view showing the filtering material partially folded.

Another important feature of the invention resides in the novel construction and formation of the filtering material which is inserted into the cylindrical member 15 for the purpose of filtering and cleaning the gas passing therethrough. As shown in Figure 4, the filtering material is preferably constructed of a porous sheet material, preferably stamped or formed in a circular disc as shown, and then preferably scored or creased as indicated by the full and dotted lines 17 and 18, respectively. After the disc has thus been scored, it is preferably folded to represent a cone-shaped member substantially star-shaped in cross-section, as shown in Figure 5, after which it is rolled or twisted as shown in Figure 6 to reduce it sufficiently in size to permit its insertion into the cylindrical member 15 as shown in Figures 2 and 3.

When the disc has thus been folded and inserted into the member 15, the lower end of the filtering material, as shown in Figures 2 and 3, will consist of several thicknesses of the material which will be firmly held against the inner walls of the casing 15 by the tension of the material when twisted into the form shown in Figure 2.

Thus it will be seen that gas passing through the filter cannot possibly pass between the filtering material and the walls of the member 15 as a result of the outward pressure of the folded sheet of material against the walls of the member 15. The upper portion of the folded sheet of filtering material, as shown in Figures 2 and 3, will be substantially out of contact with the walls of the casing 15 so that considerable surface of the filtering material will be exposed to the flow of gas, thereby increasing the efficiency of the filter.

By thus forming or folding the sheet of filtering material as above described, the upper portion thereof will substantially present a single thickness to the flow of gas so that the gas may readily penetrate the material and flow therethrough, as indicated by the arrows in Figure 3, without interfering with the supply of gas delivered to the pilot light 13.

The construction of this novel filter is also such that the filtering material may readily and quickly be removed for cleaning or replacement when necessary, as a result of becoming saturated with particles of grit and foreign material to the extent that the flow of gas through the filter will become more or less obstructed. The construction of the filtering material is also such that it may be manufactured at a minimum cost, thereby providing an inexpensive filter which may readily and conveniently be interposed in the connection supplying gaseous fluid to a burner or a pilot light.

In the accompanying drawing, I have shown the filter as used in connection with the pilot light of a water heater of ordinary construction, but it is to be understood that I do not limit its use to this particular type of structure as it may be used in connection with various types and forms of burners without departing from the invention.

I claim as my invention:

1. In a gas pipe line having a sectional expansion chamber therein, and a tubular filter member therein comprising a paper sheet folded to provide a substantially cylindrical passage, one closed end, and a series of radial over-lapping whorls acting to frictionally sealingly secure the device in filtering position, with the closed end providing substantially a single thickness of the material and being disposed on the receiving side.

2. A tubular filter member comprising a paper sheet folded to provide a substantially cylindrical passage, one closed end, and a series of radial overlapping whorls adapted to sealingly frictionally secure the device in filtering position, the closed end providing substantially a single thickness of material.

In witness whereof, I have hereunto set my hand this 21st day of August 1925.

CHARLES B. GAMBLE.